United States Patent Office 3,413,398
Patented Nov. 26, 1968

3,413,398
PURIFICATION OF POLYMYXIN
Raymond Weddle, London, England, assignor to Burroughs Wellcome & Co. (U.S.A.) Inc., Tuckahoe, N.Y., a corporation of New York
No Drawing. Filed May 18, 1964, Ser. No. 368,406
Claims priority, application Great Britain, Aug. 30, 1963, 34,394/63
13 Claims. (Cl. 424—123)

ABSTRACT OF THE DISCLOSURE

This invention relates to a method of purifying polymyxin B, polymyxin E, to the antibiotic described as colistin or colimycin which, for the purposes of this invention, is considered to be identical with polymyxin E. In particular, this invention relates to introducing a chelating agent while polymyxin is precipitated with an alkaline agent from an aqueous medium, or for combining a chelating agent to a precipitate of polymyxin. The presence of the chelating agent not only causes the polyvalent inorganic cations to remain in solution or to redissolve again, if already precipitated, but the appearance and quality of the precipitate is surprisingly much more improved than expected. According to this invention, the chelating agents are selected from the class consisting of polyaminopolycarboxylic acids and their salts, glycine derivatives and their salts, mixtures of aminocarboxylic acids derived from diethylene-triamine and nitrilotriacetic acid.

---

This invention relates to antibiotics, in particular to polymyxin, and the manufacture thereof.

Polymyxins are a family of polypeptide antibiotics, which have antibacterial activity and are most effective against Gram-negative bacteria. They are metabolic products formed in culture broths in which a strain of *Bacillus polymyxa* (syn. *Bacillus aerosporus*) or *Bacillus colistinus* have been grown. Polymyxins A, B, C, D, E and colistin are known. Colistin or colimycin, which is the product of *Bacillus colistinus*, is regarded for all purposes as a polymyxin; it is belived to be identical with polymyxin E (S. Wilkinson, Lancet (1963), (i), 922–923, and W. B. Hugo and R. J. Stetton, J. Pharm. Pharmacol (1963), 15, 490–491).

Polymyxins B and E are preferred for medical use because of their low toxicity. In this specification the term polymyxin will be used to denote polymyxins B, E and the antibiotic described as colistin or colimycin.

The polymyxins are basic substances and are conveniently prepared and used in the form of an acid addition salt with a therapeutically acceptable acid, for example, sulphuric acid. Their N-sulphomethyl derivatives, formed by a treatment with formaldehyde and a bisulphite, may also be used and have the advantage of reduced local toxicity on injection. These derivatives are usually prepared in the form of a salt with a therapeutically acceptable cation, for example sodium.

The activity of a polymyxin preparation may be determined according to the British Pharmacopoeia 1958. The potency of the preparation indicates the activity per milligram or millilitre.

Crude polymyxin, obtained from the fermentation medium usually in the form of a salt, is discoloured and contaminated by inorganic and organic matter from the medium. Methods employing precipitation, crystallisation, or adsorption on activated carbon or on ion exchange material and subsequent elution have been proposed to recover polymyxin in a purified form.

A simple precipitation of polymyxin with alkaline agents, as described in U.S.A. patent specification 2,759,868, though improving the potency of the product, suffers from the disadvantage that inorganic polyvalent cations, together with other impurities, are also precipitated. In addition, this method is only practicable in cases when the crude polymyxin has a potency of at least 3,000 unit/mg. or preferably more, because materials of lower purity usually give unworkable, sticky and gelatinous precipitates.

In U.S.A. patent application No. 174,305 (Feb. 19, 1962) now U.S. Patent 3,132,994, issued May 12, 1964, there is described a method whereby crude polymyxin is treated with permanganate solution to remove colourizing impurities. Subsequent to the treatment, manganese and other inorganic cations may be removed from the solution by ion exchange materials.

It has now been found that if a chelating agent is present when polymyxin is precipitated with an alkaline agent from an aqueous medium, or the precipitate is treated with a chelating agent in solution, the presence of these agents not only causes the polyvalent inorganic cations to remain in solution or to re-dissolve again if already precipitated, but the appearance and quality of the precipitate is surprisingly much more improved than expected, particularly in the former case. This unexpected phenomenon is believed to be probably due to the fact that while polyvalent cations usually form insoluble compounds or complexes with various, otherwise soluble organic impurities in alkaline medium, or the precipitated cations adsorb such impurities, this unwanted co-precipitation of organic impurities can now indirectly be prevented by the solubilizing action of chelating agents on inorganic cations. As a result, the manufacturing process may be greatly simplified and the end product may be produced at a higher yield than has hitherto been possible.

Accordingly, the present invention provides a method for the purification of polymyxin as hereinbefore defined, wherein a predominantly aqueous solution of an acid addition salt of polymyxin is treated with an alkaline agent, and the precipitate formed thereby is separated, characterised in that a chelating agent is present in or added to the solution, or the precipitate is subsequently treated with a solution of the chelating agent.

The solution, if not already available for instance in a manufacturing process, may be prepared by dissolving the polymyxin base in water with a sufficient quantity of acid. Acids, such as sulphuric, hydrochloric, or acetic acid, which are known to form a soluble addition salt with polymyxin may conveniently be used. Alternatively, such a salt of polymyxin may be prepared in solid form and then dissolved in water.

Preferably, a concentrated solution having a potency between 0.3 megaunit/ml. and 1.0 megaunit/ml. is used and it may also contain, to a limited extent, other solvents which are at least partially miscible with water, for instance methanol, ethanol, acetone, or diethylether. If acetone is also present in the solution, the precipitate appears to be thrown out in a form which can more easily be handled. Crude polymyxin B sulphate dissolved in an aqueous solution containing about 10% v./v. acetone and having a potency of about 0.6 megaunit/ml. has been found suitable.

Chelating agents, suitable for use in carrying out the present invention are those which form soluble compounds with polyvalent inorganic cations, and these compounds remain soluble even under alkaline conditions. In particular, agents which chelate calcium, magnesium, manganese or iron may be used. Depending on the actual composition of crude polymyxin or the solution thereof, other agents specifically chelating other cations may also be used or added.

The selection of the chelating agents is well within the knowledge of those skilled in the art, therefore the use of any appropriate agent suitable for keeping in solution the contaminating cations under alkaline conditions is within the scope of the invention.

Agents well known for this purpose include polyaminopolycarboxylic acids and their salts, such as ethylenediamine-N,N,N',N'-tetra-acetic acid (edetic acid) or the disodium or tetra-sodium salt thereof, glycine derivatives and their salts, such as N,N-di(-hydroxyethyl)glycine and N - (carboxymethyl)-N'-(2-hydroxyethyl)-N,N'-ethylenediglycine, mixtures of aminocarboxylic acids derived from diethylene-triamine, and nitrilotriacetic acid. The complexing power of the agents varies to a certain extent with the cations present. For instance, if the iron content is high, N,N-di(2-hydroxyethyl)glycine may advantageously be added. As the usual cations that contaminate polymyxin are calcium and magnesium, a 38% w./w. solution of the tetra-sodium salt of edetic acid, has been preferred.

The amount of the agent required may be estimated by determining the ash content of the crude polymyxin used or that of the dried residue of the available polymyxin solution. The assumption that the ash content consists entirely of magnesium salt, which has the lowest equivalent weight among the usual polyvalent cations, will provide a safe over-estimation of the total polyvalent inorganic ionic strength present. A quantity of the chelating agent that is equivalent to this ionic strength will certainly be sufficient. However, this estimation should not be considered to set an upper limit for the quantity of the chelating agent to be used; an excess, amounting to several times this quantity, has no apparent ill-effect on the precipitation or on the yield.

It is preferred to add the chelating agent together with the alkaline agent. Alternatively, a neutral solution, for instance a solution of the di-sodium salt of ethylenediamine-N,N,N',N'-tetra-acetic acid instead of the tetra-sodium salt, may be added to the solution of polymyxin before precipitation. Again, the polymyxin base can first be precipitated with an alkaline agent and subsequently the precipitate can be treated with a solution of the chelating agent. Though the agent is capable of re-dissolving the precipitated inorganic cations, this is a slow process and the improvement in appearance and in yield is not as marked as in the former cases.

Any alkaline agent known to precipitate polymyxin may be used such as carbonates or hydroxides of alkali metals, but a strong aqueous solution of ammonia is preferred. In all cases, the pH of the solution is adjusted to a value above pH 8.5 and preferably below pH 11, to avoid a possible partial decomposition or loss of potency of polymyxin owing to the highly alkaline medium. Usually, the optimum range of precipitation is between pH 9 and 10.5. The precipitated polymyxin base is separated from the supernatant liquid, or converted into sulphate or another salt or a derivative of polymyxin, or is further purified.

Another preferred embodiment of the process is to carry out the precipitation according to the present invention subsequent to a treatment with permanganate. Instead of using ion exchange to remove the manganese together with other cationic impurities from the solution, the present method can advantageously be applied.

According to the present invention in one aspect therefore there is provided a method for the purification of polymyxin or salts or derivatives thereof, comprising the precipitation of the polymyxin with an alkaline agent in the presence of a chelating agent from a predominantly aqueous solution of an acid addition salt of the polymxin, and the separation of the precipitate formed thereby.

In further aspect, the invention provides polymyxin B or E, or salts or derivatives thereof, which have been prepared or purified by a process using the method of the present invention.

The following examples illustrate the invention.

Example 1

100 g. crude polymyxin E sulphate (potency 1796 unit/mg.) was dissolved in 500 ml. water and the insoluble material was filtered off. To the clear solution, a mixture of 250 ml. 35% ammonia and 250 ml. of Deterex 100 (trademark) manufactured by Messrs. F. W. Berk & Company, Ltd. and containing 38% w./w. tetrasodium ethylenediamine-N,N,N',N'-tetra-acetic acid, was slowly added with constant stirring, and the solution was allowed to stand for 4 hours.

The precipitate was then collected by filtration, washed with water until free of the smell of ammonia, and vacuum-dried at a low temperature to give 6.9 g. polymyxin E base (potency 13060 unit/mg. residue on ignition 0.1%).

In another experiment carried out for the purposes of comparison 100 g. of the above crude polymyxin E sulphate was again used, and the precipitation was carried out by addition of a mixture of 250 ml. 35% ammonia and 250 ml. distilled water without using a chelating agent. 13.7 g. polymyxin E base was obtained (potency unreliable because of impurities, residue on ignition 69.6%).

Example 2

1.0 kg. crude polymyxin B sulphate (potency 1166 unit/mg. residue on ignition 21.1%), obtained from the fermentation broth, was dissolved in 10 litre water, and the insoluble material was filtered off. The clear solution was then concentrated to a volume of 5 litre at a low temperature. 0.475 N Sulphuric acid, containing 2.5% potassium permanganate, was added to the solution according to the method described in the specification of U.S.A. patent application No. 174,305 (Feb. 19, 1962) now U.S. Patent 3,132,994 issued May 12, 1964, until the pink colour was permanent for 5 minutes. About 1 litre acidified permanganate solution was required. The solution was then treated with 20 ml. 30% w./v. hydrogen peroxide to discharge the colour.

After filtration a mixture of 2.5 litre 35% ammonia and 2.0 litre "Deterex 100" was slowly added with constant stirring, and the solution was allowed to stand for 4 hours. The precipitate was collected by filtration, washed with water until free of the smell of ammonia, and vacuum-dried at a low temperature to give 67.5 g. polymyxin B base (potency 9166 unit/mg. residue on ignition 0.15%).

The product was then converted to sulphate by dissolving the base in water containing an equivalent of sulphuric acid and polymyxin B sulphate was recovered by freeze-drying. Full biological activity was retained.

Example 3

104 g. crude polymyxin E sulphate (potency 1,192 unit/mg., sulphated ash 28.1%) was dissolved in water as in Example 1, and the filtrate was made up to 1500 ml.

To 100 ml. aliquots of the solution above, 10 ml. acetone and a mixture of 25 ml. 35% ammonia and a 25 ml. solution of a chelating agent was added. The chelating agents, manufactured by Messrs. F. W. Berk & Company Ltd., were as follows:

| Sample: | Agent |
|---|---|
| 1 | 38% w./w. tetrasodium ethylenediamine-N,N,N',N'-tetra-acetic acid (Deterex 100, Trademark). |
| 2 | 34.4% w./w. trisodium N-(carboxymethyl) - N' - (2 - hydroxyethyl) - N,N'-ethylenediglycine (Deterol, Trademark). |
| 3 | Equal mixture of Deterex 100 and 39% w./w. sodium N,N-di(2-hydroxyethyl)-glycine (Deterex F, Trademark). |
| 4 | 34% w./w. solution of a mixture of aminocarboxylic acids derived from diethylenetriamine (Deterex PY, Trademark) |
| 5 | 12.5 g. trisodium nitrilotriacetic acid (Det- | erex NTA), made up to 25 ml. with water.

6 _____ Water (Reference sample).

The precipitate was collected and dried as in Example 1. Results were as follows:

| Sample | Polymyxin base obtained (g.) | Potency (unit/mg.) | Sulphated ash (percent) | Activity yield from crude sulphate (percent) |
|---|---|---|---|---|
| 1 | 0.312 | 13,310 | 2.2 | 50.2 |
| 2 | 0.317 | 13,240 | 0.65 | 50.8 |
| 3 | 0.370 | 13,290 | 0.10 | 59.5 |
| 4 | 0.310 | 13,310 | 0.46 | 50.4 |
| 5 | 0.312 | 12,660 | 2.7 | 47.8 |
|   | 0.749 | 3,646 | 61.3 | 32.8 |

Example 4

500 g. crude polymyxin B sulphate (potency 1,387 unit/mg., sulphated ash 17.6%) was dissolved in 5 litre water as in Example 2, and the filtrate was concentrated to 2.5 litre at a low temperature.

To 50 ml. aliquots of the solution above, 5 ml. acetone and a mixture of 25 ml. 35% ammonia and a 25 ml. solution of a chelating agent was added. The precipitate was collected and dried as in Example 1. Results were as follows:

| Sample | Agent | Base obtained (g.) | Potency (unit/mg.) | Sulphated ash (percent) | Activity yield from crude sulphate (percent) |
|---|---|---|---|---|---|
| 1 | Deterex 100 | 1.13 | 7,063 | 1.17 | 57.7 |
| 2 | Deterol | 1.13 | 7,191 | 1.17 | 58.7 |
| 3 | Deterex F | 1.84 | 4,965 | 0.19 | 65.8 |
| 4 | Deterex PY | 1.24 | 6,988 | 0.72 | 62.5 |
| 5 | Deterex NT | 1.13 | 7,026 | 2.22 | 57.3 |
| 6 | No agent (water) | 1.69 | 4,514 | 19.45 | 55.0 |

Example 5

1 litre of the solution obtained in Example 4 after concentration was treated with a 250 ml. solution of 0.475 N sulphuric acid containing 2.5% potassium permanganate according to the method described in the specification of U.S.A. patent application No. 174,305 (Feb. 19, 1962), now U.S. Patent 3,132,994, issued May 12, 1964. The manganese dioxide was redissolved by the addition of a minimum of hydrogen peroxide, the solution was filtered and the volume of the solution adjusted to 1.5 litre.

To 150 ml. aliquots of the solution, 15 ml. acetone and a mixture of 75 ml. 35% ammonia and a 75 ml. solution of a chelating agent was added. The precipitate was collected and dried as in Example 2. Results were as follows:

| Sample | Agent | Base obtained (g.) | Potency (unit/mg.) | Sulphated ash (percent) | Activity yield from crude sulphate (percent) |
|---|---|---|---|---|---|
| 1 | Deterex 100 | 1.86 | 7,240 | 0.42 | 48.4 |
| 2 | Deterex PY | 1.73 | 7,602 | 0.38 | 47.25 |
| 3 | Deterex NTA | 1.86 | 7,127 | 0.58 | 47.77 |
| 4 | No agent (water) | 2.99 | 4,127 | 45.4 | 44.47 |

What I claim is:

1. The method of purifying crude polymyxin selected from the class consisting of polymyxin B and polymyxin E, comprising dissolving the crude polymyxin as an acid addition salt in water to form a solution, adding a chelating agent selected from the class consisting of ethylene diamint-tetra-acetic acid, N,N'-dihydroxyethylglycine and N - carboxymethyl - N' - 2 - hydroxyethyl - N,N' - ethylenediglycine, adjusting the pH to 8.5–11.0 by addition of an alkaline solution and separating the polymyxin base so precipitated.

2. The method according to claim 1, wherein the alkaline solution is selected from the solutions of ammonia and the alkali metal hydroxides.

3. The method according to claim 2, in which the reaction takes place at ambient temperature.

4. The method according to claim 1, wherein the alkaline solution is ammonia.

5. The method according to claim 1, in which the chelating agent is added as a solution of sodium salt.

6. The method according to claim 1, in which the chelating agent is ethylenediamine-tetra-acetic acid.

7. The method according to claim 1, in which the chelating agent is N - carboxymethyl-N'-2-hydroxyethyl-N,N'-ethylenediglycine.

8. The method according to claim 1, in which the chelating agent is N,N'-dihydroxyethylglycine.

9. The method of claim 1, in which the weight of the chelating agent is 0.5 to 2 grams per gram of crude polymyxin.

10. The method of claim 1, in which the acid addition salt of polymyxin is prepared using an acid selected from the class consisting of sulphuric, hydrochloric and acetic.

11. The method according to claim 1, in which the solution contains about 10% v./v. acetone.

12. The method according to claim 1, in which a salt of the chelating agent is used.

13. The method of purifying crude polymyxin selected from the class consisting of polymyxin B and polymyxin E, comprising dissolving the crude polymyxin as an acid addition salt in water to form a solution, adjusting the pH to 8.5–11.0 by addition of an alkaline solution, separating the polymyxin base precipitated from the solution, and then adding a chelating agent selected from the class consisting of ethylene diamine-tetra-acetic acid, N,N'-dihydroxyethylglycine and N-carboxymethyl-N'-2-hydroxyethyl - N,N' - ethylenediglycine to the precipitated polymyxin base.

References Cited

UNITED STATES PATENTS 2,759,868  8/1956  Bushby _____ 167—65

FOREIGN PATENTS 647,925  12/1950  Great Britain.
658,766  10/1951  Great Britain.

ALBERT T. MEYERS, *Primary Examiner.*

D. M. STEPHENS, *Assistant Examiner.*